United States Patent [19]

Yoshihara et al.

[11] Patent Number: 4,745,156

[45] Date of Patent: May 17, 1988

[54] THERMOPLASTIC RESIN COMPOSITIONS

[75] Inventors: Masayuki Yoshihara, Osaka; Nobuo Naka; Masanori Kobayashi, both of Hyogo, all of Japan

[73] Assignee: Sumitomo Chemical Company, Limited, Osaka, Japan

[21] Appl. No.: 899,741

[22] Filed: Aug. 11, 1986

Related U.S. Application Data

[63] Continuation of Ser. No. 698,661, Feb. 6, 1985, abandoned.

[30] Foreign Application Priority Data

Feb. 7, 1984 [JP] Japan ................................. 59-21190

[51] Int. Cl.$^4$ ............... C08L 27/06; C08L 27/24; C08L 25/12; C08L 25/16
[52] U.S. Cl. ......................... 525/80; 525/75; 525/84; 525/86; 525/192; 525/211; 525/230; 525/238; 525/239
[58] Field of Search ............. 525/192, 239, 238, 211, 525/75, 230, 80

[56] References Cited

U.S. PATENT DOCUMENTS

| | | | |
|---|---|---|---|
| 2,646,417 | 7/1953 | Jennings | 525/238 |
| 3,053,800 | 9/1962 | Grabowski et al. | 525/238 |
| 3,108,988 | 10/1963 | Burri | 525/197 |
| 3,268,626 | 8/1966 | Jennings et al. | 525/234 |
| 3,644,577 | 2/1972 | Lee et al. | 525/72 |
| 4,054,615 | 10/1977 | Hardt et al. | 525/75 |
| 4,251,645 | 2/1981 | Humme et al. | 525/75 |
| 4,304,884 | 12/1981 | Okamoto | 525/238 |
| 4,337,324 | 6/1982 | Yusa et al. | 525/75 |
| 4,507,435 | 3/1985 | Suek et al. | 525/238 |

FOREIGN PATENT DOCUMENTS

| | | | |
|---|---|---|---|
| 723721 | 12/1965 | Canada | 525/239 |
| 1359178 | 3/1964 | France | 525/239 |
| 45-35665 | 11/1970 | Japan | 525/227 |
| 48032942 | 9/1971 | Japan | 525/239 |
| 1127390 | 9/1968 | United Kingdom | 525/239 |

*Primary Examiner*—Carman J. Seccuro
*Attorney, Agent, or Firm*—Sughrue, Mion, Zinn, Macpeak & Seas

[57] ABSTRACT

A polyvinyl chloride resin composition is disclosed, which contains an α-methylstyrene/acrylonitrile copolymer in a specified amount. Forming sheet materials made therefrom having high heat distortion resistance as well as a favorable balance of tensile strength and stretching characteristics at elevated temperatures and being suitable for vacuum and pressure forming are also disclosed.

6 Claims, 1 Drawing Sheet

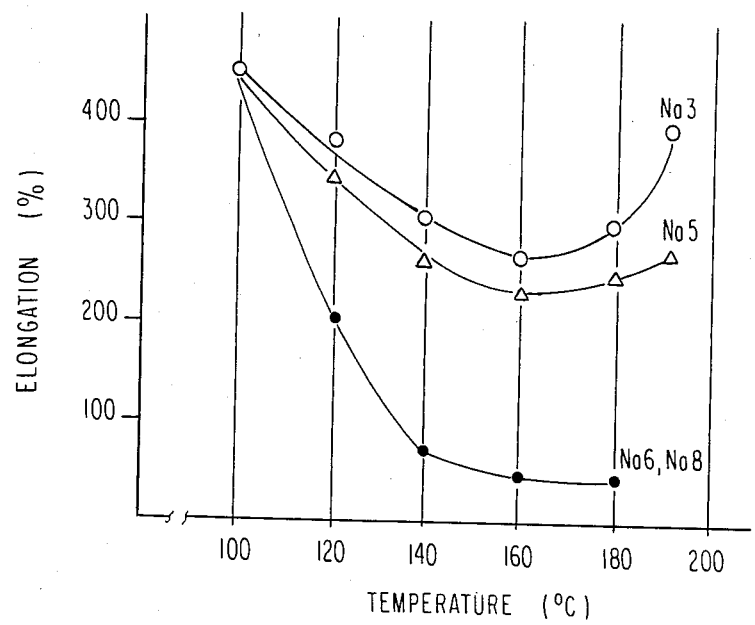

THERMOPLASTIC RESIN COMPOSITIONS

This is a continuation of application Ser. No. 698,661, filed Feb. 6, 1985, now abandoned.

FIELD OF THE INVENTION

This invention relates to forming sheet materials having excellent vacuum and pressure forming properties and high resistance to impact and heat distortion.

BACKGROUND OF THE INVENTION

Polyvinyl chloride resins have high flame retardancy, excellent resistance to chemicals, high rigidity and many other desirable properties, but suffer from low impact strength and heat distortion resistance.

In addition, it is impossible to obtain satisfactory formings from sheet materials of polyvinyl chloride resins by the vacuum or pressure forming technique because of lack in good balance of tensile strength and stretching characteristics at high temperatures.

When a sheet material of a polyvinyl chloride resin is subjected to vacuum or pressure forming at 100° to 130° C., the material undergoes some elongation but its tensile strength is still too high, thus causing various problems such as poor moldability at corner portions, large shrinkage after forming, and impracticability of deep drawing. When the forming temperature is raised to 140° C. or higher, the tensile strength decreases but stretchability is lost almost completely; the result is that satisfactory vacuum or pressure forming cannot be effected.

Such a difficulty in effecting vacuum and pressure forming, combined with poor heat distortion resistance, has made it difficult to use a polyvinyl chloride resin as a material for housing of electric and electronic parts and for many other applications.

Post-chlorination is known as a means for improving the heat distortion resistance of polyvinyl chloride resins. The resulting resin, however, has high melt viscosity and is difficult to mold. In addition, stretching characteristics of polyvinyl chloride resin at elevated temperatures cannot be improved by this modification. Thus chlorinated polyvinyl chloride resins are not suitable for vacuum and pressure forming.

It is also known that the heat distortion resistance of polyvinyl chloride resins can be enhanced by admixing appropriate amounts of chlorinated polyvinyl chloride resins. But no improvement in vacuum and pressure forming properties can be achieved by this method, too.

Other techniques to improve the thermal resistance of polyvinyl chloride resins were proposed in Japanese Patent Publication No. 6361/1964, in which a polyvinyl chloride resin is blended with poly-α-methylstyrene or a copolymer consisting mainly of α-methylstyrene, but no description can be found in the above-cited patent about impact strength and thermoformability of the resulting blend. It is generally accepted, as described in Japanese Patent Publication Nos. 24867/1970, 29895/1976 and 31818/1976 that this type of blend has the following disadvantages: As the content of α-methylstyrene in copolymers increases, compatibility with the polyvinyl chloride resin tends to lower, resulting in poor rigidity and other mechanical properties; extrusion or calendering of the copolymers fail to give sheets of good quality; and no improvement in thermal resistance and impact strength can be expected.

A large variety of techniques have been proposed for improvement of impact strength of polyvinyl chloride resins, but any of these, although effective in enhancing impact strength, tends to adversely affect heat distortion resistance and is of no use for the improvement of vacuum or pressure forming properties.

In an attempt to overcome these difficulties associated with polyvinyl chloride resins, the present inventors have found that incorporating a proper amount of an α-methylstyrene/acrylonitrile copolymer improves the heat distortion resistance of polyvinyl chloride resins, and serves to lower the tensile strength and enhance stretching characteristics at high temperatures, thus giving excellent sheet materials with significantly improved vacuum and pressure forming properties without deterioration of extrusion, calendering and other molding properties of the polyvinyl chloride resins.

SUMMARY OF THE INVENTION

An object of the present invention is to provide a resin composition comprising a polyvinyl chloride resin, an α-methylstyrene/acrylonitrile copolymer and, as desired, an impact modifier.

Another object of the present invention is to provide a forming sheet material made therefrom having excellent vacuum and pressure forming properties and high heat distortion resistance.

The resin composition of the present invention is capable of providing sheet materials with high flame retardancy and chemical resistance, if the content of a polyvinyl chloride resin component is held about 55 weight%.

BRIEF DESCRIPTION OF THE DRAWING

The FIGURE illustrates the changes in elongation with temperature for Sample Nos. 3, 5, 6 and 8 in Example 1.

DETAILED DESCRIPTION OF THE INVENTION

The polyvinyl chloride resin used in the present invention includes homopolymers of vinyl chloride and copolymers thereof containing at least 60 weight% of vinyl chloride, each having average degree of polymerization in the range from 700 to 1,500. If the average degree of polymerization is less than 700, impact strength and heat distortion resistance of the resulting resin composition will be poor. An average degree of polymerization higher than 1,500, on the other hand, will result in poor processability due to excessively high melt viscosity, and also in excessively high tensile strength at elevated temperatures, which adversely affects vacuum and pressure forming properties. It is also possible to blend polyvinyl chloride resins of different molecular weights in appropriate proportions so as to adjust the resultant average degree of polymerization within the range specified above.

The polyvinyl chloride resin of the present invention may be a mixture of 5 to 50 parts by weight of a chlorinated polyvinyl chloride resin containing 60 to 70% chlorine with 95 to 50 parts by weight of a non-chlorinated polyvinyl chloride resin. The chlorinated polyvinyl chloride may be, for example, a product obtained by introducing chlorine gas to an aqueous suspension of a polyvinyl chloride resin or of a solution thereof in a chlorinated hydrocarbon solvent. If the chlorine content of the chlorinated polyvinyl chloride is less than 60%, heat resistance will be poor. A chlorine content higher than 70%, on the other hand, will result in poor processability due to excessively high melt viscosity, and also in excessively high tensile strength at elevated temperatures, which adversely affects vacuum and pressure forming properties.

Any known impact modifiers commonly used for polyvinyl chloride resins can be used in the present invention. These include diene elastomers such as ABS and MBS resins, chlorinated polyethylene, ethylene/vinyl acetate copolymers grafted with vinyl chloride, acrylic elastomers, and EPDM (ethylene/propylene/non-conjugated diene copolymer rubber).

The EPDM type impact modifiers also include EPDM grafted with an aromatic vinyl monomer, a vinyl cyanide, a methacrylate, vinyl chloride or vinylidene chloride.

EPDM is a family of elastomeric copolymers consisting of ethylene, propylene and a non-conjugated diene. Typical examples of non-conjugated dienes are norbornenes, such as 5-methylene-2-norbornene, 5-ethylidene-2-norbornene, 5-isopropylidene-2-norbornene and 5-vinyl-2-norbornene; cyclopentadienes, such as cyclopentadiene and dicyclopentadiene; and linear dienes such as 1,4-hexadiene. As examples of the aromatic vinyl monomers may be mentioned, among others, styrene, α-methylstyrene, α-chlorostyrene and dimethylstyrene.

Illustrative vinyl cyanides are acrylonitrile, methacrylonitrile and others. Typical methacrylates are esters of methacrylic acid having from one to eight carbon atoms.

The polymerization ratio of the vinyl monomer to the elastomer may be appropriately selected depending on particular use, but usually 5 to 60 weight% of elastomer to 95 weight% of vinyl monomer is used.

The α-methylstyrene/acrylonitrile copolymer used in the present invention is a copolymer consisting of 90 to 60 weight% of α-methylstyrene and 10 to 40 weight% of acrylonitrile.

When molding a resin composition of the present invention into a forming sheet material, additives commonly employed for polyvinyl chloride resins, such as stabilizers, lubricants, antioxidants and UV absorbers, can be incorporated in appropriate amounts. Fillers can also be used as required.

In order to allow the performances of the resin composition of the present invention to be fully exhibited, it is necessary to mix the necessary components as uniformly as possible. This can be achieved by any known methods, such as kneading on roll mill, Banbury mixer and extruder. It is also possible to directly mold a powdery resin into a sheet through extrusion and calendering.

The following examples will further illustrate the present invention but are not to be considered a limitation thereupon.

EXAMPLE 1

Polyvinyl chloride with an average degree of polymerization of 800 (Sumilit Sx-8G; a product of Sumitomo Chemical Co., Ltd.), an impact modifier of acrylic type (Kane-Ace FM; a product of Kanegafuchi Chemical Industry Co., Ltd. containing a methyl methacrylate/acrylic acid ester copolymer (specifically methyl methacrylate/butyl acrylate in a ratio of about approximately ½ by weight) and a small amount of acrylonitrile) and an α-methylstyrene/acrylonitrile copolymer (monomer ratio: 70/30) were mixed in varying proportions as shown in Table 1. To 100 parts by weight of this resin mixture were added 3 parts by weight of a lead stabilizer, 1.5 parts by weight of a metal soap lubricant, 2 parts by weight of a processability improver (Kane-Ace PA-20; a product of Kanegafuchi Chemical Industry Co., Ltd.) and 3 parts by weight of $TiO_2$, and the mixture was thoroughly blended in a 75-liter Henschel mixer and molded in a 90 mmφ, single-screw extruder into a sheet 4 mm thick. Each sheet sample was tested on tensile strength at 180° C. and elongation, which provide a measure for vacuum and pressure forming properties, as well as heat resistance (Vicat softening point; 5 Kg load) and Charpy impact strength (notched). Each sheet was also subjected to vacuum forming at a surface temperature of 180° to 185° C. using a female mold of 2.5 draw ratio. The results are summarized in Table 1.

The changes in elongation with temperature (from 100° to 190° C.) for Sample Nos. 3, 5, 6 and 8 are shown in the FIGURE.

EXAMPLE 2

Polyvinyl chloride with an average degree of polymerization of 700 (Sumilit Sx-7G; a product of Sumitomo Chemical Co., Ltd.), an impact modifier of MBS type (Kane-Ace B-12; a product of Kanegafuchi Chemical Industry Co., Ltd.), chlorinated polyvinyl chloride (HA-51K; a product of Tokuyama-Sekisui Industries, Ltd.) and an α-methylstyrene/acrylonitrile copolymer (monomer ratio: 70/30) were mixed in varying proportions as shown in Table 2. The mixture was extruded in the same way as Example 1 into a sheet 4 mm thick. Each sheet sample was tested on tensile strength at 180° C., elongation, heat resistance (Vicat softening point; 5 Kg load) and Charpy impact strength (notched). The results are summarized in Table 2.

EXAMPLE 3

Polyvinyl chloride with an average degree of polymerization of 1,100 (Sumilit.Sx-11F; a product of Sumitomo Chemical Co., Ltd.), an EPDM/acrylonitrile/styrene copolymer (elastomer content: 52%) and an α-methylstyrene/acrylonitrile copolymer (monomer ratio: 70/30) were mixed in varying proportions as shown in Table 3. To 100 parts by weight of this resin mixture were added 5 parts by weight of a lead stabilizer and 3 parts by weight of $TiO_2$, and the mixture was thoroughly kneaded on a two-roll mill at 200° C. for seven minutes and compression-molded at 205° C. for ten minutes into a sheet. Each sheet sample was tested on elongation at 160° C., heat resistance (Vicat softening point; 5 Kg load) and Charpy impact strength (notched). The results are summarized in Table 3. Table 4 shows Charpy impact strength after weatherability tests under various conditions.

TABLE 1

| | Composition (parts by wt.) | | | Heating at 180° C. | | Vicat | | |
| --- | --- | --- | --- | --- | --- | --- | --- | --- |
| Sample No. | Sumilit Sx-8G | Kane-Ace FM | α-Methylstyrene/ acrylonitrile Copolymer | tensile Strength (Kg/cm²) | Elongation (%) | Softening Pt. (°C.) | VACUUM Forming Property | Impact Strength (kg-cm/cm²) |
| 1* | 70 | 15 | 15 | 1.7 | 255 | 88 | Good | 120 |

TABLE 1-continued

| Sample No. | Composition (parts by wt.) | | | Heating at 180° C. | | Vicat Softening Pt. (°C.) | VACUUM Forming Property | Impact Strength (kg-cm/cm²) |
|---|---|---|---|---|---|---|---|---|
| | Sumilit Sx-8G | Kane-Ace FM | α-Methylstyrene/ acrylonitrile Copolymer | tensile Strength (Kg/cm²) | Elongation (%) | | | |
| 2* | 65 | 15 | 20 | 1.3 | 280 | 90 | Good | 110 |
| 3* | 60 | 15 | 25 | 1.1 | 290 | 93 | Good | 110 |
| 4* | 55 | 15 | 30 | 0.8 | 350 | 96 | Good | 90 |
| 5* | 80 | — | 20 | 2.0 | 270 | 93 | Good | 5 |
| 6** | 85 | 15 | — | 2.6 | 40 | 82 | Side breakage | 150 |
| 7** | 80 | 20 | — | 2.5 | 40 | 80 | Side breakage | 160 |
| 8** | 100 | — | — | 3.0 | 45 | 85 | Side breakage | 7 |

*Invention
**Comparison

TABLE 2

| | Composition (parts by wt.) | | | | Heating at 180° C. | | Vicat Softening Pt. (°C.) | Charpy Impact Strength (Kg-cm/cm²) |
|---|---|---|---|---|---|---|---|---|
| | Sumilit Sx-7G | HA-51K | Kane-Ace B-12 | α-Methylstyrene/ acrylonitrile Copolymer | Tensile Strength (Kg/cm²) | Elongation (%) | | |
| Invention | 60 | 5 | 15 | 20 | 1.3 | 270 | 90 | 110 |
| " | 55 | 10 | 15 | 20 | 1.4 | 280 | 91 | 105 |
| " | 45 | 20 | 15 | 20 | 1.6 | 260 | 92 | 95 |
| " | 35 | 30 | 15 | 20 | 1.8 | 270 | 93 | 80 |
| Comparison | 65 | 20 | 15 | — | 2.8 | 45 | 83 | 130 |

TABLE 3

| | Composition (parts by wt.) | | | Vicat Softening Pt. (°C.) | Charpy Impact Strength (Kg-cm/cm²) | Elongation (%) |
|---|---|---|---|---|---|---|
| | Sumilit SX-11 | EPDM/acrylonitrile/styrene Copolymer | α-Methylstyrene/ acrylonitrile Copolymer | | | |
| Invention | 75 | 15 | 10 | 90 | 130 | 105 |
| " | 65 | 15 | 20 | 95 | 110 | 160 |
| " | 55 | 15 | 30 | 100 | 80 | 205 |
| " | 70 | 20 | 10 | 89 | 140 | 105 |
| " | 60 | 20 | 20 | 94 | 120 | 160 |
| " | 55 | 20 | 25 | 97 | 100 | 210 |
| Comparison | 85 | 15 | — | 83 | 140 | 40 |
| " | 80 | 20 | — | 81 | 160 | 45 |
| " | 65 | 35 | — | 76 | 160 | 60 |
| " | 100 | — | — | 86 | 7 | 40 |

TABLE 4

| | Composition (parts by wt.) | | | Charpy Impact Strength (kg-cm/cm²) Sunshine Weatherometer Exposure Time (Hr) | | | | |
|---|---|---|---|---|---|---|---|---|
| | Sumilit SX-11 | EPDM/acrylonitrile/styrene Copolymer | α-Methylstyrene/ actylonitrile Copolymer | 0 | 300 | 600 | 1000 | 2000 |
| Invention | 75 | 15 | 10 | 130 | 120 | 110 | 110 | 100 |
| " | 65 | 15 | 20 | 110 | 105 | 100 | 95 | 95 |
| " | 55 | 15 | 30 | 80 | 70 | 70 | 60 | 65 |
| " | 70 | 20 | 10 | 140 | 130 | 120 | 125 | 120 |
| " | 60 | 20 | 20 | 120 | 110 | 110 | 95 | 95 |
| " | 55 | 20 | 25 | 110 | 95 | 80 | 80 | 70 |
| Comparison | 85 | ABS Resin: 15 | | 110 | 20 | 6 | 6 | 4 |

(Note) ABS resin: Clarastick ® K-3125 (Sumitomo-Naugatak Co., Ltd.)

As can be seen from Tables 1 through 4 and the FIGURE, the resin compositions of the present invention incorporating an α-methylstyrene/acrylonitrile copolymer have significantly improved stretching characteristics at high temperatures, a favorable balance of tensile strength and stretchability at elevated temperatures, excellent vacuum and pressure forming properties, and greatly enhanced heat distortion resistance.

It is also apparent from the foregoing that the sheet materials molded from the resin compositions of the present invention are excellent in vacuum and pressure forming properties and heat distortion resistance.

While the invention has been described in detail and with reference to specific embodiment thereof, it will be apparent to one skilled in the art that various changes and modifications can be made therein without departing from the spirit and scope thereof.

What is claimed is:

1. A polyvinyl chloride resin composition comprising:
   (A) from 55 to 75% by weight of a polyvinyl chloride resin having an average degree of polymerization in the range of 700 to 1,500;
   (B) from 10 to 30% by weight of an α-methylstyrene/acrylonitrile copolymer consisting of from 90 to 60% by weight of a α-methylstyrene and from 10 to 40% by weight of acrylonitrile; and
   (C) from 15 to 20% by weight of at least one impact modifier selected from the group consisting of a methyl methacrylate/acrylic acid ester copolymer elastomer, chlorinated polyethylene, an ethylene/vinyl acetate copolymer elastomer grafted with vinyl chloride, and an ethylene/propylene/non-conjugated diene copolymer elastomer.

2. A polyvinyl chloride resin composition as defined in claim 1, wherein said polyvinyl chloride resin is a mixture of from 5 to 50 parts by weight of a chlorinated polyvinyl chloride containing from 60 to 70% by weight of chlorine and from 95 to 50 parts by weight of a non-chlorinated polyvinyl chloride.

3. A forming sheet material with excellent vacuum and pressure forming properties and high distortion resistance made from a polyvinyl chloride resin composition comprising:
 (A) from 55 to 75% by weight of a polyvinyl chloride resin having an average degree of polymerization in the range of 700 to 1,500;
 (B) from 10 to 30% by weight of an α-methylstyrene/acrylonitrile copolymer consisting of from 90 to 60% by weight of α-methylstyrene and from 10 to 40% by weight of acrylonitrile; and
 (C) from 15 to 20% by weight of at least one impact modifier selected from the group consisting of a methyl methacrylate/acrylic acid ester copolymer elastomer, chlorinated polyethylene, an ethylene/vinyl acetate copolymer elastomer grafted with vinyl chloride; and an ethylene/propylene/non-conjugated diene copolymer elastomer.

4. A forming sheet material as defined in claim 3, wherein said polyvinyl chloride resin is a mixture of from 5 to 50 parts by weight of a chlorinated polyvinyl chloride containing from 60 to 70% by weight of chlorine and from 95 to 50 parts by weight of a non-chlorinated polyvinyl chloride.

5. A polyvinyl chloride resin composition as defined in claim 1 wherein said methyl methacrylate/acrylic acid ester copolymer elastomer is a methyl methacrylate/butyl acrylate copolymer elastomer.

6. A forming sheet material as defined in claim 3 wherein said methyl methacrylate/acrylic acid ester copolymer elastomer is a methyl methacrylate/butyl acrylate copolymer elastomer.

* * * * *